(12) United States Patent
Rowland

(10) Patent No.: US 9,929,794 B2
(45) Date of Patent: Mar. 27, 2018

(54) LONG TERM EVOLUTION (LTE) AIR TO GROUND COMMUNICATION ENHANCEMENTS ASSOCIATED WITH UPLINK SYNCHRONIZATION

(71) Applicant: Honeywell International Inc., Morris Plains, NJ (US)

(72) Inventor: Andy Rowland, Ottawa (CA)

(73) Assignee: Honeywell International Inc., Morris Plains, NJ (US)

( * ) Notice: Subject to any disclaimer, the term of this patent is extended or adjusted under 35 U.S.C. 154(b) by 155 days.

(21) Appl. No.: 14/884,561

(22) Filed: Oct. 15, 2015

(65) Prior Publication Data

US 2017/0111103 A1    Apr. 20, 2017

(51) Int. Cl.
*H04B 7/185* (2006.01)
*H04W 56/00* (2009.01)
*H04W 74/08* (2009.01)

(52) U.S. Cl.
CPC ...... *H04B 7/18506* (2013.01); *H04W 56/001* (2013.01); *H04W 74/08* (2013.01)

(58) Field of Classification Search
None
See application file for complete search history.

(56) References Cited

U.S. PATENT DOCUMENTS 6,804,212 B1 * 10/2004 Vallstrom ............. H04W 36/16
                                                                    370/328
8,526,420 B2    9/2013 Weng et al.

2002/0131379 A1 * 9/2002 Lee ....................... H04B 7/2618
                                                                    370/333

(Continued)

FOREIGN PATENT DOCUMENTS

CN         102711273        10/2012
EP          2408253          1/2012

(Continued)

OTHER PUBLICATIONS

"LTE; Evolved Universal Terrestrial Radio Access (E-UTRA); Physical Layer Procedures", http://www.etsi.org, Oct. 2010, pp. 1-82, vol. 9.3.0, Publisher: European Telecommunications Standards Institute, Published in: FR.

(Continued)

*Primary Examiner* — Steven H Nguyen
(74) *Attorney, Agent, or Firm* — Fogg & Powers LLC

(57) ABSTRACT

A method for air to ground uplink synchronization comprises initiating a downlink synchronization of user equipment onboard an aircraft with a ground base station; computing a range to the base station based on a downlink path loss; selecting an initial time advance (TA) value from a set of predetermined TA values based on the range; and sending a first random access channel (RACH) request with the initial TA value to the base station in a first attempt to synchronize an uplink signal and attach the user equipment to a network. If the user equipment fails to attach, a next RACH request is sent with a next TA value to the base station, in a next attempt to synchronize the uplink signal and attach the user equipment to the network. If the user equipment fails again to attach, the method is repeated until the user equipment is attached to the network.

13 Claims, 3 Drawing Sheets

(56) References Cited

U.S. PATENT DOCUMENTS

| | | | | |
|---|---|---|---|---|
| 2007/0149206 A1* | 6/2007 | Wang | | H04W 36/0077 455/450 |
| 2008/0316103 A1* | 12/2008 | Rofougaran | | G01S 13/426 342/386 |
| 2009/0161599 A1* | 6/2009 | Haartsen | | H04W 56/00 370/326 |
| 2011/0039499 A1* | 2/2011 | Zhang | | H04W 74/008 455/67.11 |
| 2011/0223932 A1* | 9/2011 | Hole | | H04W 56/0005 455/456.1 |
| 2014/0044108 A1* | 2/2014 | Earnshaw | | G01S 5/0063 370/336 |
| 2014/0086176 A1* | 3/2014 | Liu | | H04W 72/082 370/329 |
| 2014/0148187 A1 | 5/2014 | Hong et al. | | |
| 2015/0045043 A1* | 2/2015 | Chou | | H04W 16/18 455/446 |
| 2015/0156750 A1* | 6/2015 | Quan | | H04W 74/08 370/329 |
| 2015/0181544 A1 | 6/2015 | Liu et al. | | |
| 2015/0358070 A1* | 12/2015 | Ohm | | H04B 7/0608 370/329 |
| 2015/0373740 A1* | 12/2015 | Eriksson | | H04W 74/0833 370/329 |
| 2016/0119938 A1* | 4/2016 | Frerking | | H04W 72/10 370/316 |

FOREIGN PATENT DOCUMENTS

| | | |
|---|---|---|
| EP | 2408253 A1 * | 1/2012 |
| EP | 2427018 | 3/2012 |
| EP | 2427018 A1 * | 3/2012 |
| WO | 2013063789 | 5/2013 |

OTHER PUBLICATIONS

European Patent Office, "Extended Search Report from EP Application No. 16193607.5 dated Feb. 27, 2017", Feb. 27, 2017, pp. 1-14, Published in: EP.

* cited by examiner

LONG TERM EVOLUTION (LTE) AIR TO GROUND COMMUNICATION ENHANCEMENTS ASSOCIATED WITH UPLINK SYNCHRONIZATION

BACKGROUND

Long Term Evolution (LTE) is a 4G wireless standard that provides superior performance in throughput and latency to previous generations of mobile wireless cellular standards. In addition, LTE compared to SATCOM mobile internet protocol (IP) connectivity is around an order of magnitude less expensive than the SATCOM IP service.

Providing air to ground (aircraft to ground) IP based connectivity over land masses using LTE poses a number of technical challenges, one of which is uplink synchronization, which is achieved via the random access channel (RACH). The RACH is designed for ground to ground communication, so is range limited in terms of round trip time (RTT) delay to about 100 km. It is envisioned that LTE cells for air to ground could be as large as 150 km to 200 km because of the more favorable line of sight (LOS) conditions.

Thus, a solution to uplink transmission timing is needed for air to ground (ATG) to function with realistic cell diameters.

SUMMARY

A method for air to ground uplink synchronization is provided. In one embodiment, the method comprises initiating a downlink synchronization of user equipment onboard an aircraft with a ground base station; computing a range to the ground base station based on a downlink path loss; selecting an initial time advance value from a set of predetermined time advance values based on the computed range; and sending a first random access channel (RACH) request with the initial time advance value to the ground base station in a first attempt to synchronize an uplink signal and attach the user equipment to a network. If the user equipment fails to attach to the network, a next RACH request is sent with a next time advance value from the set of predetermined time advance values to the ground base station, in a next attempt to synchronize the uplink signal and attach the user equipment to the network. If the user equipment fails again to attach to the network, the method is repeated until the user equipment is attached to the network with a current time advance value.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

Figure 1:
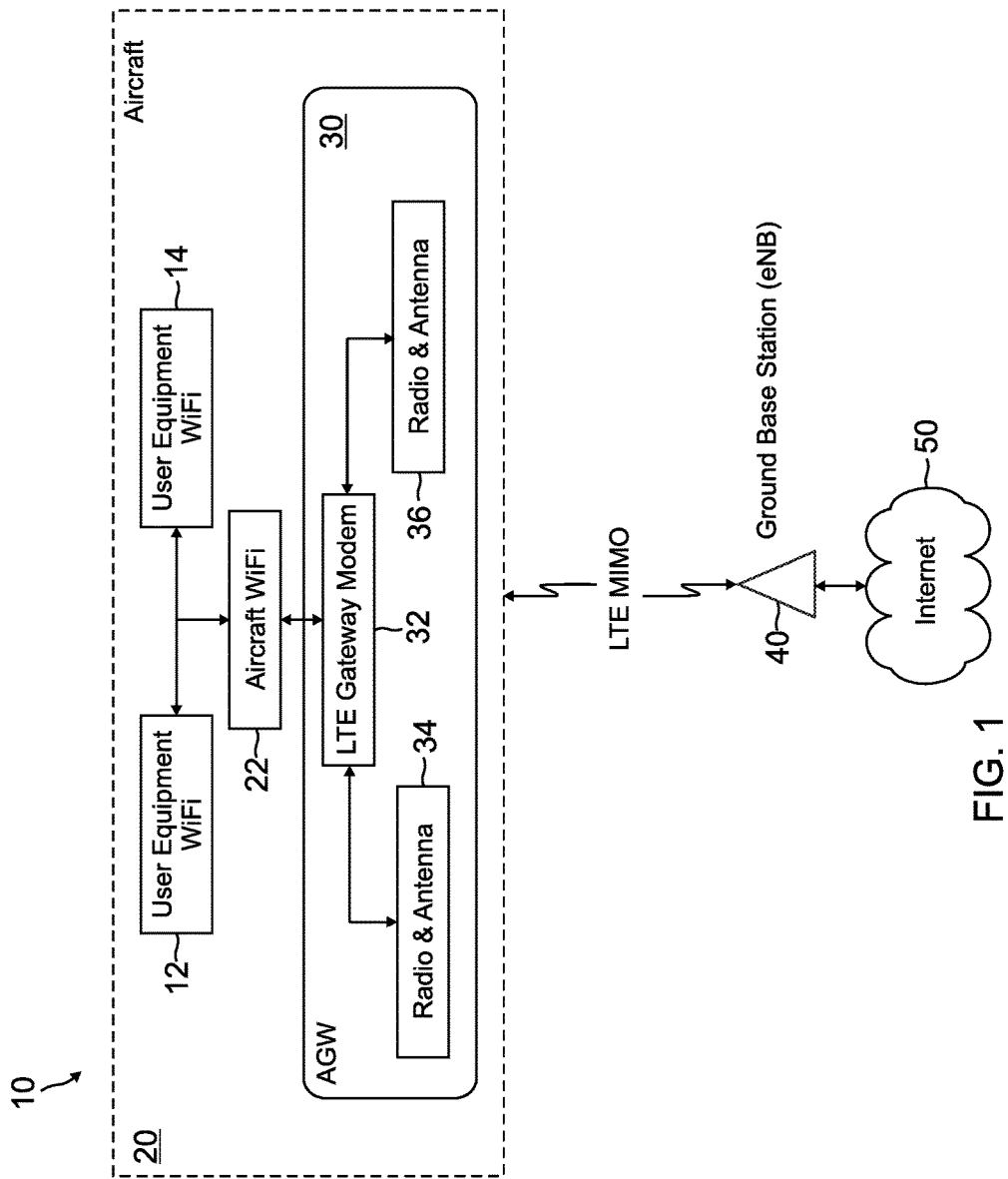
FIG. 1 is a block diagram of an air to ground communication system, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A method and system is provided for Long Term Evolution (LTE) air to ground (ATG) communication enhancements associated with uplink synchronization. An LTE ground station assumes timing based on typical terrestrial ground use. The present method and system pre-compensate ATG transmission timing such that data signals arrive at the ground station with the proper timing, even though the transmitting aircraft is far away.

The present approach implements an adaptation of timing advance of a message packet, or Time Advance (TA), which is employed in user equipment. The present TA implementation in the user equipment will permit the base ground station software to be conventional and requires no special modification to the base station software for ATG applications.

A first example of the concept of time advance is described as follows. Assume a message from a transmitter has to arrive at a receiver during a time window, which is T0 to T1. The transmitter cannot be located at greater than a first distance d1, where $d1=T1*c$, with c being the speed of light. Again, assume a message from the transmitter has to arrive at the receiver during the time window of T0 to T1. If the message is transmitted from distance d1/2, then the message will arrive at the receiver at time T1/2, which is within the T0 to T1 time window.

A second example of the concept of time advance is described as follows. Assume a message from a transmitter has to arrive at a receiver during the time window of T0 to T1. If the message is transmitted from a distance $2*d1$, then the message will arrive late ($2*T1$) if sent at T0. Again, assume a message from the transmitter has to arrive at the receiver during the time window of T0 to T1. If the message is transmitted from distance $2*d1$, then the message will arrive at time T1/2 if the message is sent early at $T=-1.5*T1$.

The present method utilizes the concept of time advance for uplink synchronization by user equipment in LTE ATG communication systems. In general, the method applies time advance to a random access channel (RACH) request by the user equipment so that the RACH request arrives at a ground base station or evolved Node-B (eNB) within an acceptable time window. In other words, the user equipment sends the RACH request early using the time advance if the user equipment is far from the base station so that the RACH request arrives at the base station at the correct time or within the time window.

For example, if the user equipment is at a distance of 0 to 15 km to the base station, no time advance (TA) would be needed, so TA=0. At a distance of 15 to 30 km, a time advance of TA=15 km/speed of light=50 μs is used; for a distance of 30 to 45 km, a TA=30 km/speed of light=100 μs is used; and so on up to the maximum cell radius. The TA the user equipment uses will be added to the TA command received from the base station in the RACH response and in subsequent uplink transmissions.

In one embodiment, the user equipment estimates/determines the time advance based on the downlink signal path loss that would affect the RACH request. The downlink signal path loss is estimated based on the distance between the user equipment and the base station.

In another embodiment, the user equipment makes successive attempts at the uplink synchronization by sending the RACH request with different time advance values. This approach starts with a RACH request having the maximum time advance value and decreases the time advance value in successive attempts.

Further details of the present method and system are described hereafter with reference to the drawings.

FIG. 1 illustrates an LTE ATG communication system 10 according to one embodiment, which can implement the uplink synchronization methods described herein. In general, communication system 10 includes user equipment 12, 14 onboard an aircraft 20. The user equipment can be any device utilized by an end user to communicate, such as a mobile phone, smartphone, tablet computer, laptop computer, and the like. The user equipment 12, 14 are in operative communication with an aircraft WiFi system 22 onboard aircraft 20. An aircraft WiFi modem and optionally a router in WiFi system 22 operatively connect to an LTE access gateway (AGW) 30, which includes an LTE gateway modem 32 and one end of the LTE protocol stack.

The AGW 30 communicates via a set of radios and antennas 34, 36 over the air to a ground base station 40, such as an evolved Node-B (eNB). The ground station 40 also has radios and antennas, as well as the other end of the LTE protocol stack. The over the air communication can occur via an LTE multiple-input and multiple-output (MIMO) method. The base station 40 is also in operative communication with the Internet 50. In implementing the methods described herein, a RACH request is sent early when aircraft 20 is at a distance from base station 40 requiring an appropriate time advance, so that the RACH request arrives at base station 40 within a correct time window.

Figure 2:
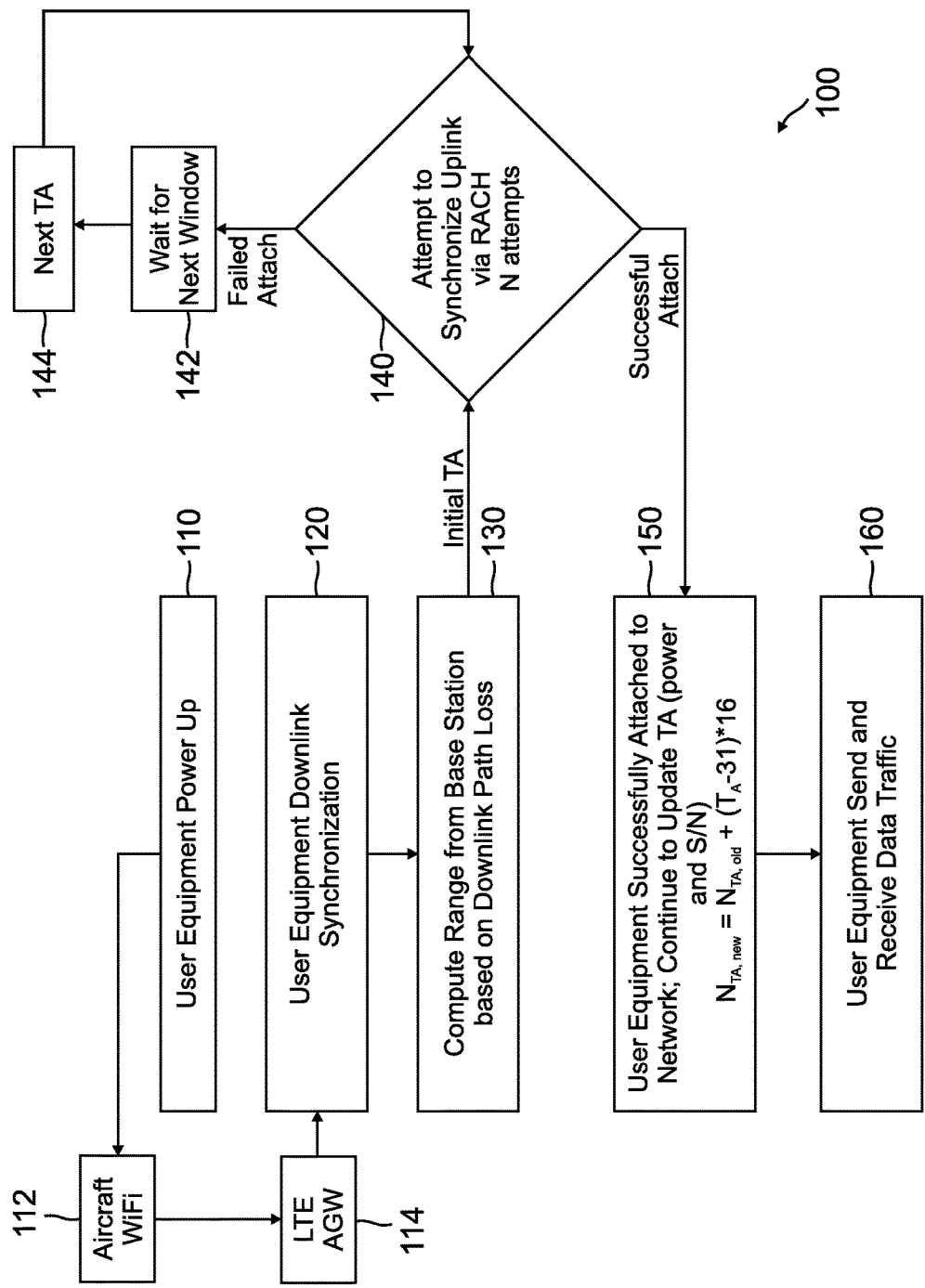
FIG. 2 is a flow diagram for a method of air to ground uplink synchronization according to one embodiment.

FIG. 2 is a flow diagram for a method 100 of air to ground LTE uplink synchronization according to one embodiment. Initially, user equipment onboard an aircraft is powered up (block 110). The user equipment then connects to an onboard aircraft WiFi (block 112), which is connected to an LTE AGW (block 114). A user equipment downlink synchronization with a ground base station is then carried out (block 120). A range from the ground base station to the aircraft is then computed based on downlink path loss (block 130). A technique for estimating range from downlink path loss is described hereafter.

Using an initial time advance (TA) value, method 100 makes a first attempt to synchronize an uplink signal via a RACH request (block 140), which is sent to the ground base station to attach the user equipment to a network. The initial TA value is selected from a predetermined set of TA values based on the computed range. If the user equipment fails to attach to a network, method 100 waits for the next available window to make another attempt (block 142). At the next available window, a next TA value from the set of TA values is selected (block 144), and another attempt to synchronize the uplink signal via a next RACH request is made at 140. If the user equipment again fails to attach to the network, the attempt to synchronize is repeated (N attempts) during an available window with a next TA value for each attempt, until the user equipment successfully attaches to the network.

After successful attachment of the user equipment to the network (block 150), method 100 continues to update the TA (power and signal-to-noise ratio (S/N)) using the following equation:

$$N_{TA,new} = N_{TA,old} + (TA-31)*16$$

where $N_{TA}$ is an integer index value of TA=0, 1, 2 ... 63 for a 6 bit TA, the amount of time alignment is given by $N_{TA}=TA*16$, with $N_{TA,old}$ being a current $N_{TA}$ value and $N_{TA,new}$ being the updated $N_{TA}$ value. This enables the user equipment to successfully send and receive data traffic (block 160).

The smallest unit of time in LTE is $Ts=3.25512^{-8}$ s. The TA is expressed in multiples of 16*Ts, with the basic TA unit being 1 $TA=8.32323^{-6}$ s. The initial TA estimate can be made based on the datalink path loss that is provided as part of the downlink synchronization message. From the path loss, the user equipment distance can be estimated. With statistical probability, the distance is more likely to be in the last 15 km (135 to 150 km) than the first 15 km (0 to 15 km) based on the cell area.

As downlink path loss is calculated by the user equipment as part of downlink synchronization, this information can be used to estimate distance or range of the user equipment from the base station. The path loss is related to distance by the Free Space Path Loss (FSPL) relationship, since it is valid to assume Line of Sight (LOS) propagation for ATG. Once the distance is estimated from the FSPL, the approximate TA can be calculated. Since other impairments can give rise to loss, it is best to make the initial estimate of TA the same or less than the calculated downlink path loss.

An exemplary technique for estimating user equipment range from downlink (DL) path loss (PL) is described as follows with respect to Table 1.

TABLE 1

| Range (km) | 150 | 135 | 120 | 105 | 90 | 75 | 60 | 45 | 30 | 15 | 0.1 |
|---|---|---|---|---|---|---|---|---|---|---|---|
| Freq DL (MHz) | 2300 | 2300 | 2300 | 2300 | 2300 | 2300 | 2300 | 2300 | 2300 | 2300 | 2300 |
| PL (dB) | 143.2 | 142.3 | 141.3 | 140.1 | 138.8 | 137.2 | 135.2 | 132.7 | 129.2 | 123.2 | 79.7 |
| TA (μs) | 500.0 | 450.0 | 400.0 | 350.0 | 300.0 | 250.0 | 200.0 | 150.0 | 100.0 | 50.0 | 0.0 |

Assume the calculated downlink path loss is 136 dB. The most likely range is 60 km, with a path loss of 135.2 dB and initial TA to be used of 200 μs (see Table 1), since path loss will be higher or equal to FSPL, never lower than FSPL. If the user equipment fails to attach, the next TA used is 250 μs since 136 dB is closer to 137.2 dB than 132.7 dB (see Table 1). Successive trials on either side of the initial range estimate should provide the fastest convergence to user equipment attachment. For example, the next TAs used would be 150 μs, followed by 300 μs then 100 μs, which would be followed by 350 μs then 50 μs, and so on.

The path loss can always be greater than predicted (due to shadowing or other impairment), but should not be lower in loss than the prediction. For example, if the downlink path loss is estimated as less than 123 dB, an initial TA for the RACH request would be T=0, as indicated in Table 1. If the user equipment fails to attach, a successively increased TA of 50 μs increments is used until successful uplink synchronization is achieved. If, however, downlink path loss is estimated as less than 141 dB, the initial TA for the RACH request would be TA=350 μs, as indicated in Table 1. If the user equipment fails to attach, a successively increased TA of 50 μs increments is used until successful uplink synchronization is achieved. If connection is unsuccessful at the TA max of 500 μs, the method wraps around to TA=0, and increases by 50 μs increments to 350 μs until there is a successful connection.

Figure 3:
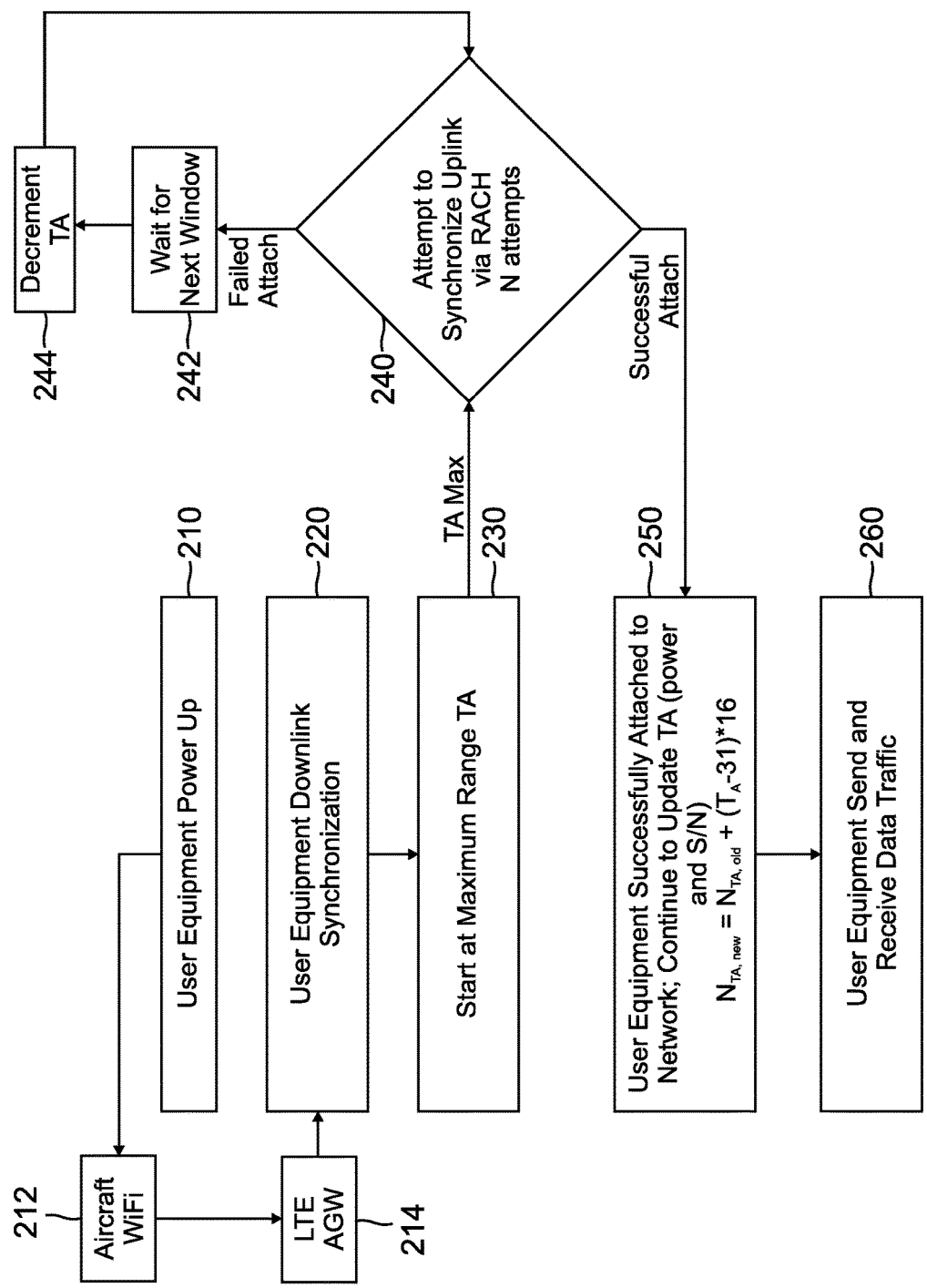
FIG. 3 is a flow diagram for a method of air to ground uplink synchronization according to another embodiment.

FIG. 3 is a flow diagram for a method 200 of air to ground LTE uplink synchronization according to another embodiment. Initially, a user equipment onboard an aircraft is powered up (block 210). The user equipment then connects to an onboard aircraft WiFi (block 212), which is connected to an LTE AGW (block 214). A user equipment downlink synchronization with a ground base station is then performed (block 220). Using a maximum range time advance value (TA max) selected from a set of predetermined time advance values, method 200 starts at TA max (block 230) in a first attempt to synchronize an uplink signal via a RACH request (block 240) sent to the ground base station to attach the user equipment to a network.

If the user equipment fails to attach to a network, method 200 waits for the next available window to make another attempt (block 242). At the next available window, method 200 decrements the TA value (block 244), and the attempt to synchronize the uplink signal via the RACH request is repeated at 240. If the user equipment again fails to attach to the network, the attempt to synchronize is repeated (N attempts) during an available window with a decremented TA value for each attempt, until the user equipment successfully attaches the network.

After successful attachment of the user equipment to the network (block 250), method 200 continues to update the timing advance (power and S/N) using the following equation:

$$N_{TA,new} = N_{TA,old} + (TA-31)*16$$

This enables the user equipment to successfully send and receive data traffic (block 260).

An example of method 200 is described as follows, referring again to Table 1. Starting at a maximum range TA of 500 μs, successive RACH request attempts use a decreased TA of 50 μs (450, 400, 350, etc.) until successful uplink synchronization is achieved.

The present technique can also be implemented in other embodiments. For example, if a main antenna and a diversity antenna on an aircraft are co-located at low elevation angles, engine blockage can occur that causes additional path loss. Such additional path loss can be around 10 dB for a realistic elevation angle of about minus 5 degrees, which corresponds to aircraft towards the edge of coverage. The additional path loss will result in an overestimate of the downlink path loss and the resulting range will also be overestimated. In this situation, the present approach can be implemented by making a first RACH attempt corresponding to a range estimate from the downlink path loss, with subsequent RACH attempts being performed at successively decreasing TAs.

As an example and referring again to Table 1, if an aircraft is at a range of 90 km, with an 8 dB engine blockage, the downlink path loss can be estimated as 146.8 dB. Hence, the first RACH request attempt will be at a TA of 500 μs. The first RACH attempt will undoubtedly fail, but since engine blockage can only be positive, the next RACH attempt should be at a lower TA to converge quickly on the correct TA. In this example, five attempts should result in a successful RACH response from the base station with TA of 300 μs at a range of 90 km.

In another situation, if the aircraft antennas are mounted both fore (first antenna) and aft (second antenna), the downlink path losses can be calculated independently for both of the antennas. For example, referring again to Table 1, if the aircraft is at a range of 90 km, with the second antenna having an 8 dB engine blockage, the downlink path loss for the antennas can be estimated as follows:

first antenna path loss=138.8 dB;
second antenna path loss=146.8 dB.

The first RACH attempt TA is estimated from the antenna reporting the lowest path loss, which in this example is 138.8 dB, giving an initial TA of 300 μs. With this TA value, the first RACH attempt is very likely to be successful.

A computer or processor used in the present method and system can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present method and system.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer- or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact disks, DVDs, Blu-ray discs, or other optical storage disks; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

Example Embodiments

Example 1 includes a method for air to ground uplink synchronization, the method comprising: (a) initiating a downlink synchronization of user equipment onboard an aircraft with a ground base station; (b) computing a range to the ground base station based on a downlink path loss; (c) selecting an initial time advance value from a set of predetermined time advance values based on the computed range; (d) sending a first random access channel (RACH) request with the initial time advance value to the ground base station in a first attempt to synchronize an uplink signal and attach the user equipment to a network; (e) if the user equipment fails to attach to the network, sending a next RACH request with a next time advance value from the set of predetermined time advance values to the ground base station, in a next attempt to synchronize the uplink signal and attach the user equipment to the network; and (f) if the user equipment fails again to attach to the network, repeating step (e) until the user equipment is attached to the network with a current time advance value.

Example 2 includes the method of Example 1, wherein when the user equipment is attached to the network, the method further comprising updating the current time advance value using the equation: $N_{TA,\ new}=N_{TA,\ old}+(TA-31)*16$, where TA is the time advance value, $N_{TA}$ is an integer index value of the TA, an amount of time alignment is given by $N_{TA}=TA*16$, $N_{TA,old}$ is a current $N_{TA}$ value, and $N_{TA,new}$ is an updated $N_{TA}$ value.

Example 3 includes the method of any of Examples 1-2, wherein the user equipment is configured for long term evolution (LTE) communications.

Example 4 includes the method of Example 3, wherein the user equipment is in operative communication with a WiFi system onboard the aircraft, and the WiFi system is operatively connected to an LTE access gateway onboard the aircraft.

Example 5 includes the method of any of Examples 1-4, wherein the aircraft includes at least a first antenna co-located with at least a second antenna at a low elevation angle on the aircraft.

Example 6 includes the method of Example 5, wherein a current next time advance value used in a current RACH request is decreased from a previous next time advance value used in a previous RACH request.

Example 7 includes the method of any of Examples 1-4, wherein the aircraft includes at least a first antenna mounted at the front of the aircraft, and at least a second antenna mounted at the rear of the aircraft.

Example 8 includes the method of Example 7, wherein a downlink path loss is calculated independently for each of the first and second antennas.

Example 9 includes the method of Example 8, wherein the initial time advance value is estimated from the antenna having the lowest downlink path loss.

Example 10 includes a computer program product, comprising: a non-transitory computer readable medium having instructions stored thereon executable by a processor to perform a method for air to ground uplink synchronization according to Example 1.

Example 11 includes a system for air to ground uplink synchronization, the system comprising: a processor onboard an aircraft; and a non-transitory computer readable medium having instructions stored thereon executable by the processor to perform a method comprising: (a) initiating a downlink synchronization of user equipment onboard the aircraft with a ground base station; (b) computing a range to the ground base station based on a downlink path loss; (c) selecting an initial time advance value from a set of predetermined time advance values based on the computed range; (d) sending a first random access channel (RACH) request with the initial time advance value to the ground base station in a first attempt to synchronize an uplink signal and attach the user equipment to a network; (e) if the user equipment fails to attach to the network, sending a next RACH request with a next time advance value from the set of predetermined time advance values to the ground base station, in a next attempt to synchronize the uplink signal and attach the user equipment to the network; and (f) if the user equipment fails again to attach to the network, repeating step (e) until the user equipment is attached to the network with a current time advance value.

Example 12 includes the system of Example 11, wherein when the user equipment is attached to the network, the method further comprising updating the current time advance value using the equation: $N_{TA,\ new}=N_{TA,\ old}+(TA-31)*16$, where TA is the time advance value, $N_{TA}$ is an integer index value of the TA, an amount of time alignment is given by $N_{TA}=TA*16$, $N_{TA,old}$ is a current $N_{TA}$ value, and $N_{TA,new}$ is an updated $N_{TA}$ value.

Example 13 includes the system of Example 11, wherein the user equipment is configured for long term evolution (LTE) communications; the user equipment is in operative communication with a WiFi system onboard the aircraft; and the WiFi system is operatively connected to an LTE access gateway onboard the aircraft.

Example 14 includes the system of Example 11, wherein when the aircraft includes at least a first antenna co-located with at least a second antenna at a low elevation angle on the aircraft, a current next time advance value used in a current RACH request is decreased from a previous next time advance value used in a previous RACH request.

Example 15 includes the system of Example 11, wherein when the aircraft includes at least a first antenna mounted at the front of the aircraft, and at least a second antenna mounted at the rear of the aircraft, a downlink path loss is calculated independently for each of the first and second antennas.

Example 16 includes the system of Example 15, wherein the initial time advance value is estimated from the antenna having the lowest downlink path loss.

Example 17 includes a method for air to ground uplink synchronization, the method comprising: (a) initiating a downlink synchronization of user equipment onboard an aircraft with a ground base station; (b) selecting a maximum range time advance value from a set of predetermined time advance values; (c) sending a first random access channel (RACH) request with the maximum range time advance value to the ground base station in a first attempt to synchronize an uplink signal and attach the user equipment to a network; (d) if the user equipment fails to attach to the network, sending a next RACH request with a decremented next time advance value from the set of predetermined time advance values to the ground base station, in a next attempt to synchronize the uplink signal and attach the user equipment to the network; and (e) repeating step (d) until the user equipment is attached to the network with a current time advance value.

Example 18 includes the method of Example 17, wherein when the user equipment is attached to the network, the method further comprising updating the current time advance value using the equation: $N_{TA,\ new}=N_{TA,\ old}+(TA-31)*16$, where TA is the time advance value, $N_{TA}$ is an integer index value of the TA, an amount of time alignment is given by $N_{TA}=TA*16$, $N_{TA,old}$ is a current $N_{TA}$ value, and $N_{TA,new}$ is an updated $N_{TA}$ value.

Example 19 includes a computer program product, comprising: a non-transitory computer readable medium having instructions stored thereon executable by a processor to perform a method for air to ground uplink synchronization according to Example 17.

Example 20 includes a system comprising: a processor onboard an aircraft; and a non-transitory computer readable medium having instructions stored thereon executable by the processor to perform a method for air to ground uplink synchronization according to Example 17.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method for air to ground uplink synchronization, the method comprising:
   (a) initiating a downlink synchronization of user equipment onboard an aircraft with a ground base station, wherein at least a first antenna and a second antenna are mounted on the aircraft;
   (b) computing a range to the ground base station based on a downlink path loss, wherein the downlink path loss is calculated independently for each of the first and second antennas;
   (c) selecting an initial time advance value from a set of predetermined time advance values based on the computed range, wherein the initial time advance value is estimated from the antenna having the lowest downlink path loss;
   (d) sending a first random access channel (RACH) request with the initial time advance value to the ground base station in a first attempt to synchronize an uplink signal and attach the user equipment to a network;
   (e) if the user equipment fails to attach to the network, sending a next RACH request with a next time advance value from the set of predetermined time advance values to the ground base station, in a next attempt to synchronize the uplink signal and attach the user equipment to the network; and
   (f) if the user equipment fails again to attach to the network, repeating step (e) until the user equipment is attached to the network with a current time advance value.

2. The method of claim 1, wherein when the user equipment is attached to the network, the method further comprising:
   updating the current time advance value using the equation:

$$N_{TA,new} = N_{TA,old} + (TA-31)*16,$$

where TA is the time advance value, $N_{TA}$ is an integer index value of the TA, an amount of time alignment is given by $N_{TA} = TA*16$, $N_{TA,old}$ is a current $N_{TA}$ value, and $N_{TA,new}$ is an updated $N_{TA}$ value.

3. The method of claim 1, wherein the user equipment is configured for long term evolution (LTE) communications.

4. The method of claim 3, wherein the user equipment is in operative communication with a WiFi system onboard the aircraft, and the WiFi system is operatively connected to an LTE access gateway onboard the aircraft.

5. The method of claim 1, wherein the first antenna is co-located with the second antenna at a low elevation angle on the aircraft.

6. The method of claim 5, wherein a current next time advance value used in a current RACH request is decreased from a previous next time advance value used in a previous RACH request.

7. The method of claim 1, wherein the first antenna is mounted at the front of the aircraft, and the second antenna is mounted at the rear of the aircraft.

8. A computer program product, comprising:
   a non-transitory computer readable medium having instructions stored thereon executable by a processor to perform a method for air to ground uplink synchronization, the method comprising:
   (a) initiating a downlink synchronization of user equipment onboard an aircraft with a ground base station, wherein at least a first antenna and a second antenna are mounted on the aircraft;
   (b) computing a range to the ground base station based on a downlink path loss, wherein the downlink path loss is calculated independently for each of the first and second antennas;
   (c) selecting an initial time advance value from a set of predetermined time advance values based on the computed range, wherein the initial time advance value is estimated from the antenna having the lowest downlink path loss;
   (d) sending a first random access channel (RACH) request with the initial time advance value to the ground base station in a first attempt to synchronize an uplink signal and attach the user equipment to a network;
   (e) if the user equipment fails to attach to the network, sending a next RACH request with a next time advance value from the set of predetermined time advance values to the ground base station, in a next attempt to synchronize the uplink signal and attach the user equipment to the network; and
   (f) if the user equipment fails again to attach to the network, repeating step (e) until the user equipment is attached to the network with a current time advance value.

9. A system for air to ground uplink synchronization, the system comprising:
   a processor onboard an aircraft; and
   a non-transitory computer readable medium having instructions stored thereon executable by the processor to perform a method comprising:
   (a) initiating a downlink synchronization of user equipment onboard the aircraft with a ground base station, wherein at least a first antenna and a second antenna are mounted on the aircraft;
   (b) computing a range to the ground base station based on a downlink path loss, wherein the downlink path loss is calculated independently for each of the first and second antennas;
   (c) selecting an initial time advance value from a set of predetermined time advance values based on the computed range, wherein the initial time advance value is estimated from the antenna having the lowest downlink path loss;
   (d) sending a first random access channel (RACH) request with the initial time advance value to the ground base station in a first attempt to synchronize an uplink signal and attach the user equipment to a network;
   (e) if the user equipment fails to attach to the network, sending a next RACH request with a next time advance value from the set of predetermined time advance values to the ground base station, in a next attempt to synchronize the uplink signal and attach the user equipment to the network; and
   (f) if the user equipment fails again to attach to the network, repeating step (e) until the user equipment is attached to the network with a current time advance value.

10. The system of claim 9, wherein when the user equipment is attached to the network, the method further comprising:
    updating the current time advance value using the equation:

$$N_{TA,new} = N_{TA,old} + (TA-31)*16,$$

where TA is the time advance value, $N_{TA}$ is an integer index value of the TA, an amount of time alignment is given by $N_{TA}=TA*16$, $N_{TA,old}$ is a current $N_{TA}$ value, and $N_{TA,new}$ is an updated $N_{TA}$ value.

11. The system of claim 9, wherein:
    the user equipment is configured for long term evolution (LTE) communications;
    the user equipment is in operative communication with a WiFi system onboard the aircraft; and
    the WiFi system is operatively connected to an LTE access gateway onboard the aircraft.

12. The system of claim 9, wherein when the first antenna is co-located with the second antenna at a low elevation angle on the aircraft, a current next time advance value used in a current RACH request is decreased from a previous next time advance value used in a previous RACH request.

13. The system of claim 9, wherein the first antenna is mounted at the front of the aircraft, and the second antenna is mounted at the rear of the aircraft.

* * * * *